(12) United States Patent
Santosh et al.

(10) Patent No.: US 11,605,045 B2
(45) Date of Patent: Mar. 14, 2023

(54) ADDRESS EXCHANGE SYSTEMS AND METHODS

(71) Applicant: MapMyId, Inc, Alpharetta, GA (US)

(72) Inventors: Kush Santosh, Alpharetta, GA (US); Akshat Keshan, Cupertino, CA (US); John Lee, San Ramon, CA (US); Arunachalam Muthu, Fremont, CA (US); Fakhruddin Hatim Chopdawala, Pune (IN)

(73) Assignee: MapMyId, Inc., Alpharetta, GA (US)

( * ) Notice: Subject to any disclaimer, the term of this patent is extended or adjusted under 35 U.S.C. 154(b) by 888 days.

(21) Appl. No.: 16/292,298

(22) Filed: Mar. 4, 2019

(65) Prior Publication Data

US 2019/0197465 A1  Jun. 27, 2019

Related U.S. Application Data

(63) Continuation-in-part of application No. 16/245,243, filed on Jan. 10, 2019, and a continuation-in-part of
(Continued)

(51) Int. Cl.
*G06Q 20/00* (2012.01)
*G06Q 10/083* (2023.01)
(Continued)

(52) U.S. Cl.
CPC ............ *G06Q 10/083* (2013.01); *G06F 9/54* (2013.01); *G06F 21/6245* (2013.01);
(Continued)

(58) Field of Classification Search
CPC .... G06Q 10/083; G06Q 10/08; G06Q 20/085; G06Q 20/385; G06Q 50/01; G06Q 20/384; G06Q 20/405; G06F 9/54; G06F 21/6245
(Continued)

(56) References Cited

U.S. PATENT DOCUMENTS

| 7,240,035 B1 | 7/2007 | Engstrom |
| 7,729,359 B1 | 6/2010 | Kumar |

(Continued)

FOREIGN PATENT DOCUMENTS

| JP | 2002002916 | 1/2002 |
| KR | 101397130 | 6/2014 |

(Continued)

OTHER PUBLICATIONS

International Search Report and Written Opinion of the International Searching Authority prepared by the USPTO in connection with PCT/US2019/20628, dated May 23, 2019; Entire Document (20 pages).

(Continued)

*Primary Examiner* — Dante Ravetti
(74) *Attorney, Agent, or Firm* — K&L Gates LLP

(57) ABSTRACT

The present disclosure provides systems and methods for an address exchange system including a controller configured to provide an API configured to receive an identifier from a user and further configured not to receive a physical address from the user, wherein the user provides an item for shipment to the physical address. In response to receiving the identifier, the controller is further adapted to request the physical address from a data storage system wherein the data storage system stores an association between the identifier and the physical address and further stores one or more permission settings defining situations in which the physical address is to be provided in response to receipt of the identifier. In response to receipt of the identifier, the data storage system tests the permission settings to determine whether or not to provide the associated physical address.

20 Claims, 6 Drawing Sheets

Related U.S. Application Data application No. 16/244,096, filed on Jan. 9, 2019, now abandoned, which is a continuation-in-part of application No. 15/652,370, filed on Jul. 18, 2017, now Pat. No. 10,628,779, application No. 16/245,243, which is a continuation-in-part of application No. 15/652,370, filed on Jul. 18, 2017, now Pat. No. 10,628,779, said application No. 16/292,298 is a continuation-in-part of application No. 14/801,521, filed on Jul. 16, 2015, now abandoned, application No. 15/652,370, which is a continuation of application No. 14/681,356, filed on Apr. 8, 2015, now Pat. No. 9,710,778, which is a continuation of application No. 14/016,099, filed on Aug. 31, 2013, now Pat. No. 9,009,859.

(60) Provisional application No. 62/638,362, filed on Mar. 5, 2018, provisional application No. 62/025,460, filed on Jul. 16, 2014, provisional application No. 61/697,824, filed on Sep. 7, 2012.

(51) Int. Cl.
| | | |
|---|---|---|
| *G06Q 20/08* | (2012.01) | |
| *G06F 9/54* | (2006.01) | |
| *G06Q 10/08* | (2023.01) | |
| *G06F 21/62* | (2013.01) | |
| *G06Q 20/38* | (2012.01) | |
| *G06Q 50/00* | (2012.01) | |

(52) U.S. Cl.
CPC ........... *G06Q 10/08* (2013.01); *G06Q 20/085* (2013.01); *G06Q 20/385* (2013.01); *G06Q 50/01* (2013.01)

(58) Field of Classification Search
USPC .......................... 705/16, 21, 59; 280/44, 262
See application file for complete search history.

(56) References Cited

U.S. PATENT DOCUMENTS

| | | | |
|---|---|---|---|
| 10,592,888 B1 | 3/2020 | Ellis et al. | |
| 2002/0022967 A1 | 2/2002 | Ohkado | |
| 2002/0116337 A1 | 8/2002 | Peled et al. | |
| 2007/0088749 A1 | 4/2007 | Lorch et al. | |
| 2008/0059329 A1 | 3/2008 | Luchene et al. | |
| 2008/0250430 A1 | 10/2008 | Salgado et al. | |
| 2011/0258078 A1 | 10/2011 | Sonderegger et al. | |
| 2012/0123946 A1 | 5/2012 | Walker et al. | |
| 2012/0323663 A1 | 12/2012 | Leach | |
| 2013/0290234 A1 | 10/2013 | Harris et al. | |
| 2014/0019352 A1 | 1/2014 | Shrivastava | |
| 2014/0136327 A1* | 5/2014 | Gopavarapu | G06Q 30/0267 705/14.58 |
| 2014/0236767 A1 | 8/2014 | Duggal et al. | |
| 2014/0324633 A1 | 10/2014 | Pollak et al. | |
| 2014/0337246 A1 | 11/2014 | Williams et al. | |
| 2015/0220914 A1* | 8/2015 | Purves | G06Q 30/0633 705/41 |
| 2016/0125412 A1 | 5/2016 | Cannon | |
| 2016/0292636 A1 | 10/2016 | Moody et al. | |
| 2017/0186037 A1 | 6/2017 | Brady | |
| 2019/0197464 A1 | 6/2019 | Santosh et al. | |
| 2020/0041419 A1 | 2/2020 | Pollak et al. | |
| 2020/0250681 A1 | 8/2020 | Keith | |

FOREIGN PATENT DOCUMENTS

| | | |
|---|---|---|
| KR | 101883459 | 7/2018 |
| WO | 00/57337 A1 | 9/2000 |
| WO | 01/08066 A1 | 2/2001 |
| WO | 2020201898 | 10/2020 |

OTHER PUBLICATIONS

Wikipedia, "QR Code," published by www.wikipedia.com on Nov. 7, 2015 (year: 2015) (4 pages).
"Shipping Labels 101: How to Create a Shipping Label and More", published by thefulfillmentlab.com on Nov. 27, 2020 (year: 2020) (3 pages).
International Search Report and Written Opinion dated Jan. 28, 2022 in corresponding PCT Application No. PCT/US2021/049648 (12 pages).
Response filed Jul. 14, 2022 for U.S. Appl. No. 17/224,822 (11 pages).
Response filed Jan. 18, 2022 for U.S. Appl. No. 17/224,822 (13 pages).
Response filed Oct. 7, 2021 for U.S. Appl. No. 17/224,822 (17 pages).
Response filed Jan. 18, 2022 for U.S. Appl. No. 16/245,243 (15 pages).
Response filed Sep. 20, 2021 for U.S. Appl. No. 16/245,243 (15 pages).

* cited by examiner

FIG. 5

Checkout

Billing Address → Receiver's Email → Shipping Method → Payment Method → Confirmation Shipping Information Receiver's Email Address

| johndoe@gmail.com | ~20

Receiver's Name

| John Doe | ~30

Gift Message

| Happy Birthday!
Love, Jane |

Cart

| 1 Shower Curtain | 20.00 |
| 1 Hooks (12 set) | 10.00 |
| Total | 30.00 |

Go Back    Submit

ADDRESS EXCHANGE SYSTEMS AND METHODS

CROSS-REFERENCE TO RELATED APPLICATIONS

This application claims the benefit of priority to U.S. Provisional Application No. 62/638,362 filed Mar. 5, 2018, comprises a continuation-in-part application of and claims the benefit of priority to U.S. patent application Ser. No. 16/245,243 filed Jan. 10, 2019 and U.S. patent application Ser. No. 16/244,096 filed Jan. 9, 2019, each of which comprises a continuation-in-part application and claims the benefit of priority to U.S. patent application Ser. No. 15/652,370 filed Jul. 18, 2017, which is a continuation application of and claims the benefit of priority to U.S. patent application Ser. No. 14/681,356 filed Apr. 8, 2015, which is a continuation application of and claims the benefit of priority to U.S. patent application Ser. No. 14/016,099 filed Aug. 31, 2013, which claims the benefit of priority to U.S. Provisional Application No. 61/697,824 filed on Sep. 7, 2012, and comprises a continuation-in-part and claims the benefit of priority to U.S. patent application Ser. No. 14/801,521 filed Jul. 16, 2015, which claims the benefit of priority to U.S. Provisional Application No. 62/025,460 filed Jul. 16, 2014, each of which is also incorporated by reference in its entirety.

BACKGROUND OF THE INVENTION

The present subject matter relates generally to systems and methods for an online identification to a physical address exchange platform.

In today's society, people are identified by a plethora of identifiers including their name, social security number, bank account number, residential address, password, birth date, and email address, among others. These forms of identity management are often "validated" by various regulated government organizations. As a result, these forms of identity management are reliable and useful for "real-life" offline transactions. By contrast, in the digital/online world, most online identities are based on unregulated and self-controlled parameters such as email address, mobile phone number, social media identities (e.g., Facebook identity, LinkedIn identity), etc. There is a need for a system that connects these two worlds in a meaningful way.

Because many identifiers are confidential information, most people prefer to keep their information private. However, individuals are continually asked to share their identifiers with third parties, for example, by providing a mailing address to a third party or by providing a billing address when purchasing an item online. However, it may be unsafe to share identifiers, such as a physical address, with unknown individuals. Moreover, the more confidential information an individual discloses, the more likely the person will be subjected to privacy challenges.

During a typical transaction, a sender selects an item from a retailer's website to send to a receiver. During checkout, the sender must input his or her name, the billing address of the buyer, gift options, the name of the receiver, the address of the receiver, and the phone number of the receiver. Based on the large amount of required information, many senders decide not to complete the purchase owing to either not having the time to complete the checkout process or because the sender may not have all of the receiver's personal information. For example, the sender may not have the physical address of the recipient and, perhaps, does not feel comfortable asking for such personal information from the receiver. In addition, physical addresses change often such that it is difficult for senders to track the changes in address in order to determine the most current address to use as the mailing address.

From a recipient's perspective, providing his or her residential address is not safe. In addition, updating a change of address is often a time consuming and laborious process. Typically, a recipient must update their address information in each organization. For example, a recipient must update their address with the post office, department of motor vehicle, internal revenue service, energy company, magazine subscriptions, place of employment, among a multitude of others.

In addition, conventional systems do not take into account the recipient's preference in shipping location. For example, a recipient may want certain packages sent from friends to be mailed to his or her home address, whereas the recipient may want to gifts from colleagues to be mailed to his or her work address.

Further, the rise of online shopping has led to an increase in shipping and logistics-related issues of delivery of online purchases. It has also led to an increased cost of digital and direct marketing, and a significant decrease in brick and mortar retail as well as store operations costs. There has also been a loss in commission charges on transactions accrued by brokers and agents, which are avoided through online purchasing. Product discovery has become easier, product reviews have become important, and competition has grown. In some instances, consumers have seen lower prices over time, and, with so many options available, sellers are under pressure to provide the best price. Every best price guarantee comes with multiple terms and conditions, making it difficult to compare offers on equal footing. Every consumer wants best price, but it has become increasingly difficult to find.

Often direct marketing companies send random offers or coupons or samples to their database list. However, many of these samples don't reach right recipient because of the use of a wrong or old address. Further, sometimes these samples or offers may not be relevant for consumers who receive them but could be very relevant to some of the consumer's connections (friends, relatives, or other relationships), but are unable to refer to them as they may not have their addresses at the time of referral. Conventional systems also fail to take advantage of social media connections, therefore, missing a valuable market opportunity. Further, the brands must absorb the costs associated with failed direct marketing attempts, increasing the end cost to the consumer. Traditional direct marketing also creates hurdles for brands by requiring brand to track consumer behavior, location, frequently visited locations, frequently purchased items, and other details using GPS-based mobile applications, digital cookies, discount offers, location-based offers, and other data.

Further, consumers are typically nervous to broadcast their needs, demands, and requirements online or otherwise in public for the fear of losing privacy and also because such broadcasting may result in overwhelming unsolicited contact (e.g., calls, mail, email, etc.). With better targeted connections between sellers and buyers, there are opportunities to eliminate middle men to more efficiently reduce the cost of the product to consumers.

Additionally, the use of a physical mailing address requires consumers to update residential addresses with businesses and government entities, including ecommerce stores, physical stores, credit card companies, gyms, club memberships, coffee shops, airlines, magazine subscriptions, hospitals, banks, and the United States Postal Service. This process of updating a mailing address with each entity separately becomes complex and time-consuming. Further, with the growth of international transactions, many parties have difficulty with inconsistent address formatting and language barriers, requiring a lot of effort and creating unnecessary delays. Local governments of growing cities and towns also experience challenges with defining addresses in terms of street number, street name, unit number, province or district, county, zip codes, and other address details, requiring community members to update records upon local changes to the system. In some cases, those updates are required frequently.

Accordingly, there is a need for systems and methods directed to an address system that does not jeopardize an individual's privacy information while considering a recipient's preferences.

BRIEF SUMMARY OF THE INVENTION

The present disclosure provides systems and methods for an address exchange platform. Various examples of the systems and methods are provided herein.

The present address exchange system is a technology platform that manages and provides confidential information, such as a residential address, to third party merchants, retailers, and shipping companies. The present system provides various integration points with third party companies, such as retailers, merchants, shipping companies, government agencies, financial institutions, or any other organization that collects and uses an address of its members. In one example, the address exchange system receives an email address of an intended recipient from a sender and provides a physical address of a receiver based on the submitted email address of the receiver. In other words, the system allows senders to send packages and gifts to receivers based only on the sender providing a receiver's identification, such as the receiver's email address or phone number, thereby maintaining the confidential nature of a physical address.

In an embodiment, the address exchange system comprises a memory coupled to the controller, wherein the memory is configured to store program instructions executable by the controller. In response to executing the program instructions, the controller is configured to provide an API configured to receive an identifier from a user and further configured not to receive a physical address from the user, wherein the user provides an item for shipment to the physical address.

In response to receiving the identifier, the controller is further adapted to request the physical address from a data storage system wherein the data storage system stores an association between the identifier and the physical address, and retrieve the physical address and calculate an actual shipping cost based on the physical address.

In an example, the system further stores one or more permission settings defining situations in which the physical address is to be provided in response to receipt of the identifier. In an example, in response to receipt of the identifier, the data storage system tests the permission settings to determine whether or not to provide the associated physical address.

The determination as to whether or not to provide the associated physical address may further include verifying a password associated with the physical address, wherein the data storage system further stores a password linked to the associated identifier and physical address.

The permission settings may include one or more domains to which the physical address may be provided when the identifier is received from the one or more domains. Alternatively, or in addition to, the permission settings may include a setting requiring the data storage system to request and receive approval to provide the associated physical address via a direct communication made according to a predefined communication protocol.

The predefined communication protocol may be an email message, an SMS message, a phone call, a mobile application communication, or combinations thereof.

In an example, the user interface may be provided within an ecommerce platform and/or an online shipping platform.

In another embodiment, the address exchange system comprises a memory coupled to the controller, wherein the memory is configured to store program instructions executable by the controller. In response to executing the program instructions, the controller is configured to provide a data storage system storing an association between an identifier and a physical address and further storing one or more permission settings defining situations in which the physical address is to be provided in response to receipt of the identifier. The controller is further configured to receive a request to provide the physical address, wherein the request includes the identifier. In response to receiving a request to provide the physical address, the data storage system tests the permission settings to determine whether or not to provide the associated physical address.

The request to provide the physical address may be received from an API, wherein the API is configured to receive an identifier from the user and further configured not to receive the physical address from the user. The request to provide the physical address may further include a password.

The determination as to whether or not to provide the associated physical address may further include verifying the password, wherein the data storage system further stores a password linked to the associated identifier and physical address.

The permission settings may include one or more domains to which the physical address may be provided when the request to provide the physical address is received from the one or more domains. The permission settings may include a setting requiring the data storage system to request and receive approval to provide the associated physical address via a direct communication made according to a predefined communication protocol.

The predefined communication protocol may be an email message, an SMS message, a phone call, a mobile application communication, or combinations thereof.

For example, a platform may be provided that enables users to map their regulated/validated offline identifiers to their online identifiers. For example, users may map validated offline identifiers such as any one or more of their name, social security number, bank account number, residential address, password, birth date, and email address, among others to their online/digital identifiers such as any one or more of email address, mobile phone number, social media identities, etc. By first identifying themselves to the platform using a validated identity and then mapping that validated identity to the online/digital identities, users provide the backbone structure that then enables the platform to map online relationships to offline relationships, which in turn enables augmented transactions requiring reliance on validated identities to be performed through the use of online/digital identities.

Once a user's online and offline identities have been mapped, relationships between those identities can be mapped. For example, online/digital relationships are often defined by "Facebook Friends," "LinkedIn Connections," "Twitter Followers," "WhatsApp Buddies," etc., while offline relationships are defined by friends, family, business acquaintances, colleagues, classmates, etc. While it is generally acceptable and desirable to extend one's online connections openly and broadly, it is much less acceptable to be as open with one's offline details.

When a user provides one or more validated offline identities to the platform and then maps those identities to the related online/digital identities, the platform can then map the online and offline relationships and enable users to communicate openly using their online identities while maintaining the security of their offline information. Moreover, a user's connection to another user though one online platform (e.g., a social media platform) may be used to make connections in a second online platform, without the users actually connecting in the second online platform. As a result, real world, offline transactions, can be enabled through the platform leveraging the convenience and accessibility of the online world to empower offline transactions.

For example, shipments of goods can be made to a residential address by providing the platform with an email address. A first user can map his online and offline addresses, a second user can purchase a gift for the first user from a retailer, and rather than provide a mailing address for the first user, the second user can simply provide the first user's email address, and the platform can securely communicate the appropriate shipping information to the retailer. This example may appear even more powerful by noting that despite not having mailing addresses for the majority of contacts in one's mobile phone, the platform provided herein enables users to ship offline goods to offline addresses using the information that is in fact stored in the contacts in a mobile phone (i.e., phone numbers and email addresses). Similarly, rather than simply wishing a friend happy birthday through Facebook, through the platform a user can send an offline gift to another Facebook user using only the Facebook identity and without Facebook having access to either user's offline information.

In another example, using the platform, a first user may map his Facebook identity with his offline identity, including his mailing address. The first user may be connected to a second user through LinkedIn, but not through Facebook. The second user may wish to use the first user's online/digital identity to send a gift to the first user from an online retailer. Although the first user hasn't mapped his LinkedIn identity to his offline identity, the platform can identify that the first and second users are connected via LinkedIn, can identify the first user's mailing address because the first user has mapped his mailing address and his Facebook identity (which is mapped to his LinkedIn identity), and can authorize providing the mailing address to the retailer based on the first user's preferences settings (i.e., "enable LinkedIn connections to send gifts to my residential address without sharing my residential address with my LinkedIn connections"). Now, all of a user's online relationships may be mapped to his or her offline identity through a single secure platform.

As shown, the preferences settings within the platform may be used to allow or restrict functionality within the platform such as enabling certain types of connections to make use of certain types of offline information while preventing the use of other types of offline information. For example, a user may wish to enable gifting by social media connections, but may have much more restricted access to functionality based on banking details. There are countless variations that will be readily understood by those skilled in the art based on the disclosures provided herein.

The platform enables augmented transactions and functionality in fraud prevention (e.g., businesses can rely on online identities being mapped to offline identities), contact address management, improved functionality of dating websites and apps, personal and business mailing address management, mobile commerce, gifting, product sample requests, etc.

A primary example of augmenting a transaction based on mapped relationships relies on an address exchange system. While used as a primary example, it is understood that the examples provided with respect to an address exchange system are applicable across numerous verified identification-based exchange platforms. For example, rather than providing an online identifier to securely communicate an offline address, the platform may be used to provide an online identifier to securely communicate banking details, social security numbers, etc.

It is contemplated that the systems and methods described herein may be implemented in various use cases. One such case is integration with dating sites. For example, a user on a dating site may set up a profile including a public profile and a private profile, wherein the profiles include public and private wishlists and/or preferences. For example, a woman's public profile may include information such as where she likes to dine, her favorite colors and flowers, her hobbies, where she likes to travel, etc. Her private profile may include further details such as her shoe size, her clothing size, first date ideas, etc. As shown, the private information may be very relevant information for a suitor, but would not typically be shared on a public site due to privacy concerns.

Then, when a potential date visits the user's profile page, the system allows the potential date to view the public profile and/or the private profile based on the system settings. For example, the private profile may only be accessible to premium members. Or the private profile may only be available to specific people selected/approved by the user. Or the private profile may only be available to people that meet other user or system defined criteria. In still other scenarios, the private profile is never accessible to other system users, but it is available to third-party merchants, as described further below.

For example, a suitor may visit the woman's public profile and see that she likes shoes and see the retailer through which she likes to buy her shoes. The suitor may then, through the system, choose to buy shoes for the woman from the retailer. The suitor need only select to purchase shoes, choose a price range, and choose the recipient. The system then shares the private profile information (in this case including the woman's preferred style of shoe, her preferred color, and her size information) with the retailer, but not with the suitor. The system may further share the woman's delivery information with the retailer, but not with the suitor. Thus, the suitor can purchase a gift that will be well received, but not be given any of the woman's sensitive information.

An advantage of the present systems and methods is mapping online and offline relationships to enable augmented transactions.

An advantage of the present systems and methods is providing a solution to the challenge of sending gifts or packages without knowing the recipient's address. Similarly, the system does not require a recipient to disclose his or her residential address to third parties or strangers.

A further advantage of the present systems and methods is providing a safe and secure way of mapping online and offline identifications, wherein the identifications may be used in various applications.

Yet another advantage of the present systems and methods is allowing merchants to focus on their core business, instead of spending time and money directed to determining a correct address for shipments and tracking lost packages.

A further advantage of the present systems and methods is distilling the process to the core participants and components, including the product manufacturer and the delivery channels, while eliminating brokers, agents, and marketplaces.

Another advantage of the present systems and methods is providing a single platform to map online and offline identifications, thereby avoiding multiple registrations with each merchant of users' physical mailing address.

A further advantage of the present systems and methods is providing more efficient commerce and shipping solutions, including ecommerce solutions.

Another advantage of the present system is enabling retailers to complete more transactions and focus on their primary business instead of spending time and resources devoted to obtaining and tracking physical addresses.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 5 is an example of a screen shot of a check out interface including an option to enter the receiver's email address.

DETAILED DESCRIPTION OF THE INVENTION

Referring to FIGS. 1-6, the present application discloses an address exchange system that standardizes and globalizes a unique address mechanism for all enabling transactions and communications between users without the disclosure of the recipient's physical mailing address to the sender. The address exchange system provides a unique digital identification, such as a phone number or an email address, that becomes the primary, universal identification of each user.

By replacing the physical mailing with a digital identification, the system simplifies transactions between two or more parties by enabling the shipment of products without needing a traditional mailing or GPS address. As technology has evolved to make international transactions more common, the use of a digital identification helps to avoid problems arising from multiple language and address formatting inconsistences as well as problems arising in communities experiencing significant growth with changes in land development and urban planning.

Figure 1:
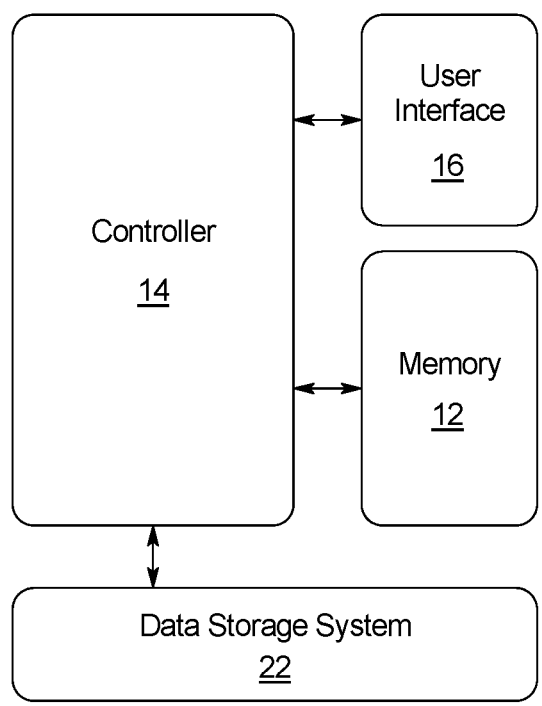
FIG. 1 is a schematic of an embodiment of the address exchange system.

The present disclosure provides an address exchange system 10 comprising a memory 12 coupled to the controller 14, wherein the memory is configured to store program instructions executable by the controller 14, as shown in FIG. 1. In response to executing the program instructions, the controller 14 is configured to provide an API 16 configured to receive an identifier 19 from a user 15 and further configured not to receive a physical address 18 from the user, wherein the user 15 provides an item for shipment to the physical address 18. While the address exchange system 10 of the description provided herein may be used to exchange address information, it is understood that the system 10 may also be used to exchange products and other information. The user 15 may be any person or entity. In the majority of examples in the present application, the user 15 is a retailer, merchant, or shipping entity. For example, in FIGS. 2-4, the user 15 is a retailer or shipping entity. However, the user 15 is not limited to retailers and shipping entities, but includes any organization, entity, or person that uses a unique identifier to provide a physical mailing address. As described in greater detail below, the system helps consumers to make a request (such as an offer to purchase) and helps brands selling tangible and intangible goods (such as consumer brands, hotels, travel, insurance, cars, or any other product) to bid for consumers business.

Further, the physical mailing address may be any identifiable location, including a postal address or a geo code based on metrics such as longitude, latitude, and elevation determined by the Global Positioning System (GPS), a geographic information system (GIS), geographic coordinates, or other services. In a further embodiment, a user may upload one or more photos of each physical address or delivery location associated with a delivery location profile so that a third-party delivery company or the party delivering the item to understand the exact location for the delivery to improve efficiency and accuracy. The delivery location profile may be shared with third-party shipping companies and any other party (seller, vendor, brand, other user, etc.) as authorized by the user.

In a further embodiment, in response to executing the program instructions, the controller 14 is configured to provide an API configured to receive an online identifier 19 and an action request 23 from the sender 32. In response to receiving the online identifier 19 and the action request 23, the controller 14 may access a data storage system 22 that stores an association between the online identifier 19 and one or more offline identifiers 21 related to the receiver 30, and further may store one or more permission settings defining action requests 23 to allow in response to receipt of the online identifier 19. The controller 14 may test the permission settings to determine whether or not to allow the action request 23. In an embodiment, the testing of the permission settings includes determining whether there is a relationship between the first user and the second user in a social media platform 48. Non-limiting example relationships include Facebook friends, LinkedIn connections, and Instagram followers. In addition to third party social network services such as Facebook and LinkedIn, the social media platform 48 may receive digital identifications of the receiver 32 and other users from the sender 32 that specify a relationship such as "friend" or "family." In this example, the controller 14 may test the permission settings by determining whether there is a relationship (e.g., "friend" or "family") between the digital identifications of the first user and the second user on the social media platform 48. For purposes of this description, such digital identifications identifying relationships between users without using a third party social services network are considered relationships on the social media platform 48.

Each of the online identifier 19 and the action request 23 may relate to a second user. For example, the online identifier 19 may be an email address, a mobile phone number, or a username on a social media platform. The action request 23 may be a request to request to provide an offline identifier 21 of the second user to a retailer 15 to enable product exchanging between the first user and the second user without sharing the second user's personal information with the first user. For example, the first user may send a gift, a sample, or a product to the second user without the learning the physical address of the second user. Alternatively, or in addition to, the action request 23 may be a request to access the second user's personal information stored in the data storage 22.

Figure 2:
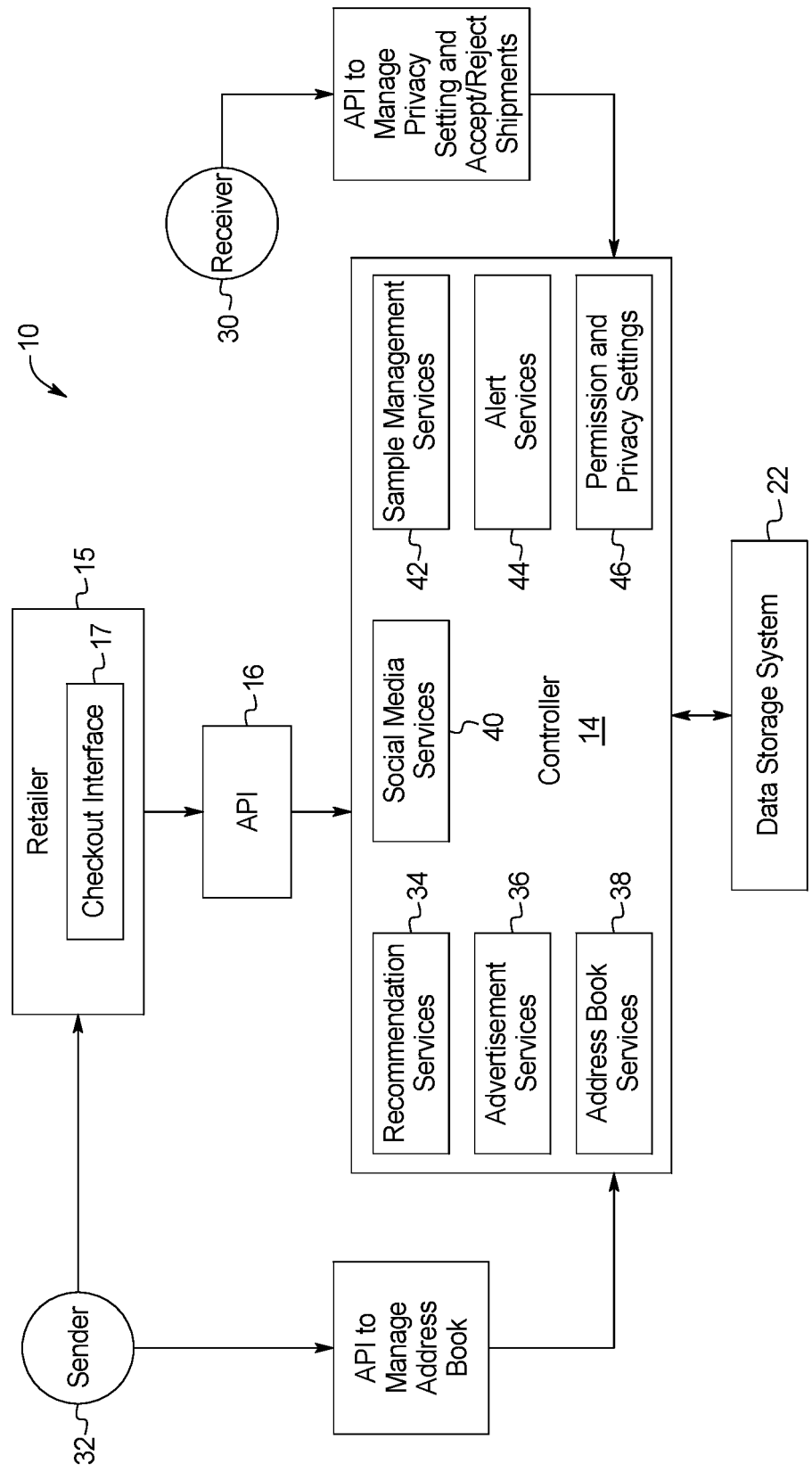
FIG. 2 is a schematic of an embodiment of the address exchange system in relation to a sender and receiver.

FIG. 2 illustrates the interplay between the address exchange system 10 and a sender 32, a user 15, and a receiver 30. For example, the sender 32 may be a person that selects a gift from goods sold by a user 15 (e.g., retailer), and desires the user 15 to ship the gift to the intended receiver 30. In another example, the sender 32 may be the same person or entity as the receiver 30, such as when a person buys and ships an item to himself or herself. The user 15 (e.g., retailer) interacts with the controller 14 via the API 16. The API 16 is configured to receive an identifier 19 from the user 15, and further configured not to receive the physical address 18 from the user 15. In other words, system 10 allows a sender 32 to send a shipment based on the identifier 19 of the receiver 30. In another example, the sender 32 interacts with the controller 14 via the API, and the API is configured to receive an online identifier 19 from the sender 32. In a still further embodiment, the controller 14 may communicate with one or more social media platforms 48 to request and receive validation of a relationship between the first user and the second user in a social media platform 48, such as Facebook friends, LinkedIn connections, and Instagram followers.

Although throughout this disclosure the receiver 30 is identified by the recipient identifier 19 of an email address 20, it should be understood that any suitable identifier 19 may be used. For example, identifier 19 may be a telephone number associated with the intended receiver 30, wherein the telephone number is associated with the physical address 18. Telephone numbers are standard across countries and therefore well-suited for use as the digital identification in the system, although any form or type of digital identification may be used. Similarly, the identifier 19 may be a social network identification of the receiver 30, wherein the social network identification is associated with the physical address 18 of the receiver 30. In other words, the controller 14 may be configured to receive any identifier 19 of the receiver 30 that is associated with the receiver's 30 physical address 18, including, but not limited to, an email address 20, social network identification, phone number, or any other unique identifier, or combinations thereof. Further, it should be understood that the identifier 19 may be associated with other address types, not just physical addresses 18. For example, the identifier may be associated to an electronic address for a receiver 30 to receive electronic gifts or other communications. As a result, the system 10 enables a receiver 30 to receive an electronic gift from a sender 32 without disclosing the receiver's 30 electronic address to the sender 32.

In an example, the sender 32 submits an online identifier 19 of the receiver 30 (e.g., a Facebook username) and the item to be shipped (e.g., a pair of shoes) to the controller 14. The controller 14 first determines an association of the online identifier 19 with one or more offline identifiers 21, such as a physical address 18 and validates the relationship of the sender 32 and the receiver 30 on a social media platform 48. The controller 14 then provides the online identifier 19 (e.g., the Facebook username) and the item to be shipped (e.g., the shoes) to the user 15 (an online retailer). The user 15 coordinates the shipment of the shoes to the receiver 30 through the use of the API 16 and the controller 14 as described above.

In a further example, the sender 32 may submit an online identifier 19, such as a mobile phone number, and a request to access personal information regarding the receiver 32, such as banking information, stored in the data storage system 22. The second user may permit different levels of access to the personal information based on profile settings associated with a profile on a social media platform 48. For example, the second user may allow Facebook friends that have "family member" status to access banking information while Facebook friends related by school do not have such access.

In another embodiment, the system 10 provides a single platform in which a sender 32 may submit an identifier 19 associated with an intended receiver 30 in order to send a shipment or gift to the receiver 30 without necessarily the sender 32 and the receiver 30 being connected in a social network. For example, a sender 32 may know an email identifier 19 of a receiver 30 based on a connection in a first social network, and the system 10 may provide a gift to the receiver 30 in a second social network, notwithstanding the sender 32 and receiver 30 may not be connected in the second social network. Further, the system 10 may provide a gift to the receiver 30 through a second social network, such as an electronic gift, notwithstanding the sender 32 and receiver 30 may not be connected in the second social network.

In one example, a sender 32 (e.g., consumer, buyer, purchaser, company, brand, etc.) selects an item for shipment to a physical address 18 through a checkout interface 17 that is in communication with the user 15. The checkout interface 17 and/or the API 16 may be provided within an ecommerce platform or product, as well as an online shipping platform. For example, the sender 32 may provide the identifier 19 associated with the intended receiver 30 of the item to the checkout interface 17. The user 15 may then provide the email address 20 to the controller 14 via the API 16. Merchants or sellers can bid through API's, or any other channel, to accept, counteroffer, or charge consumers or receivers.

In addition to providing the identifier 19 of the receiver 30 to the controller 14, the user 15 may also provide information associated with the sender 32. For example, the user 15 may provide identification of the sender and transaction details associated with the item being purchased and/or shipped. The identification of the sender 32 may include a name, email address, telephone number, address, social network identification, or any other suitable identification of the sender 32. The transaction details may include the retailer or store the item is purchased or shipped, the content of the item being shipped, the time frame of the shipping dates, among other information. In other words, the controller 14 may be configured to provide an API 16 configured to receive an identifier 19 associated with the receiver 30, an identification associated with the sender 32, and transaction details associated with the item, and further configured not to receive a physical address 18 from the user, wherein the sender 32 provides an item for shipment to the physical address 18.

In response to receiving the identifier 19, the controller 14 is further adapted to request the physical address 18 from a data storage system 22 wherein the data storage system 22 stores an association between the identifier 19 and the physical address 18. The data storage system 22 may be any suitable storage system, for example, a database. The data storage system 22 may be located within the controller 12 or located externally from the controller 12. In an example, the data storage system 22 is located externally from the system 10, wherein the data storage system 22 is wirelessly accessible by the controller 12. It is understood that the data storage system 22 may be a third party data system, such as a USPS database 22, an online retailer's database 22, etc.

The data storage system 22 may further store one or more permission settings 24 defining situations in which the physical address 18 is to be provided in response to receipt of the identifier 19. The permission settings 24 may include one or more domains to which the physical address 18 may be provided when the identifier 19 is received from the one or more domains. For example, the permission settings 24 may be set such that, if the identifier 19 is received from a certain user 15, such as a specific person or website associated with a certain retailer, then the controller 14 is authorized to provide the physical address 18 to that specific person or retailer. The permission settings 24 may include providing the identification of the sender 32 and transaction details associated with the item being received.

Alternatively, or in addition to, the permission settings 24 may include a setting requiring the data storage system 22 to request and receive approval to provide the associated physical address 18 via a direct communication made according to a predefined communication protocol 28. For example, the approval may be dependent on the identification of the sender 32 as well as the transaction details. In other words, the permission settings 24 may include granting permission if the request is from a certain sender 32. However, the permission settings 24 may include denying permission to receive the item if the transaction details indicate the item is flowers, for example, if the receiver 30 has allergies.

The predefined communication protocol 28 may be an email message, an SMS message, a phone call, a mobile application communication, such as a mobile app to app communication, or combinations thereof. For example, the permission settings 24 may be set such that the controller 14 is configured to send an email to a person or entity (e.g., receiver 30) associated with the physical address 18 requesting permission to provide the physical address 18 to the user 15, for example, a merchant or shipping company. Further, the permission settings 24 may be customized by the receiver 30 via an API to manage the privacy and settings for the receiver 30 and sender 32, wherein the API 16 is in communication with the controller 14, as shown in FIG. 2.

In response to receipt of the identifier 19, the data storage system 22 tests the permission settings 24 to determine whether or not to provide the associated physical address 18. For example, if the permission settings 24 include sending an SMS message, then the controller 14 sends an SMS message requesting authority to provide the physical address 18 to the user 15. If authority is granted, then the controller 14 provides the physical address 18 to the user 15. As understood by one skilled in the art, the identifier 19 and/or the physical address 18 may be encrypted when sent and decrypted when received.

The permission settings 24 may be set such that the controller 14 is configured to receive and verify a password 26 in order to provide the physical address 18 to the user 15. Further, the determination as to whether or not to provide the associated physical address 18 may further include verifying the password 26, wherein the data storage system 22 further stores the password 26 linked to the associated email address 20 and physical address 18. In other words, in addition to requesting authority from a person or entity associated with the physical address 18, the controller 14 may be configured to request and confirm a password 26 associated with the physical address, before authority is received or denied.

The system may include a secure log-in or a multi-factor authentication module to ensure that receivers are not receive mail from "fake" senders. The multi-factor authentication may include steps to be performed via email, SMS, and telephone, and may be automatically initiated if the sender is unknown or does not know the receiver's address.

Although throughout the description, the example of the controller 14 receiving an identifier 19 from the user 15 and providing an associated physical address 18 to the user 15 is used, it should be understood that other methods of providing the physical address 18 are contemplated within this disclosure. For example, upon receiving an identifier 19 and obtaining the associated physical address 18 from the data storage system 22, the physical address 18 may be provided to the user 15 in text form or as a code, such as bar code or QR code, or any other encrypted manner. When user 15 is a retailer, for example, the physical address 18 is provided to the user 15 in the form of a shipping label including a bar code or QR code, the physical address 18 remains confidential and may not be disclosed to the user 15.

In a further embodiment, the system may utilize a third-party shipping company to ship the product from the seller to the user in order to avoid disclosure of the receiver's physical address to the seller. The system generates a each unique transaction code that is unique to each transaction and shared with each party involved in the transaction. A third-party shipping company may obtain the unique transaction code generated by the system from the seller or another party involved with the transaction, and scan the code within the system in order to retrieve the shipping address. In this embodiment, the seller does not have access to the receiver's personal information. This embodiment prevents sellers from using shipping details from a first purchase (such as through eBay or Amazon) to directly reach out to the customer to upsell or cross-sell products, offer additional discounts, provide catalogs, or for any other purpose.

Figure 3:
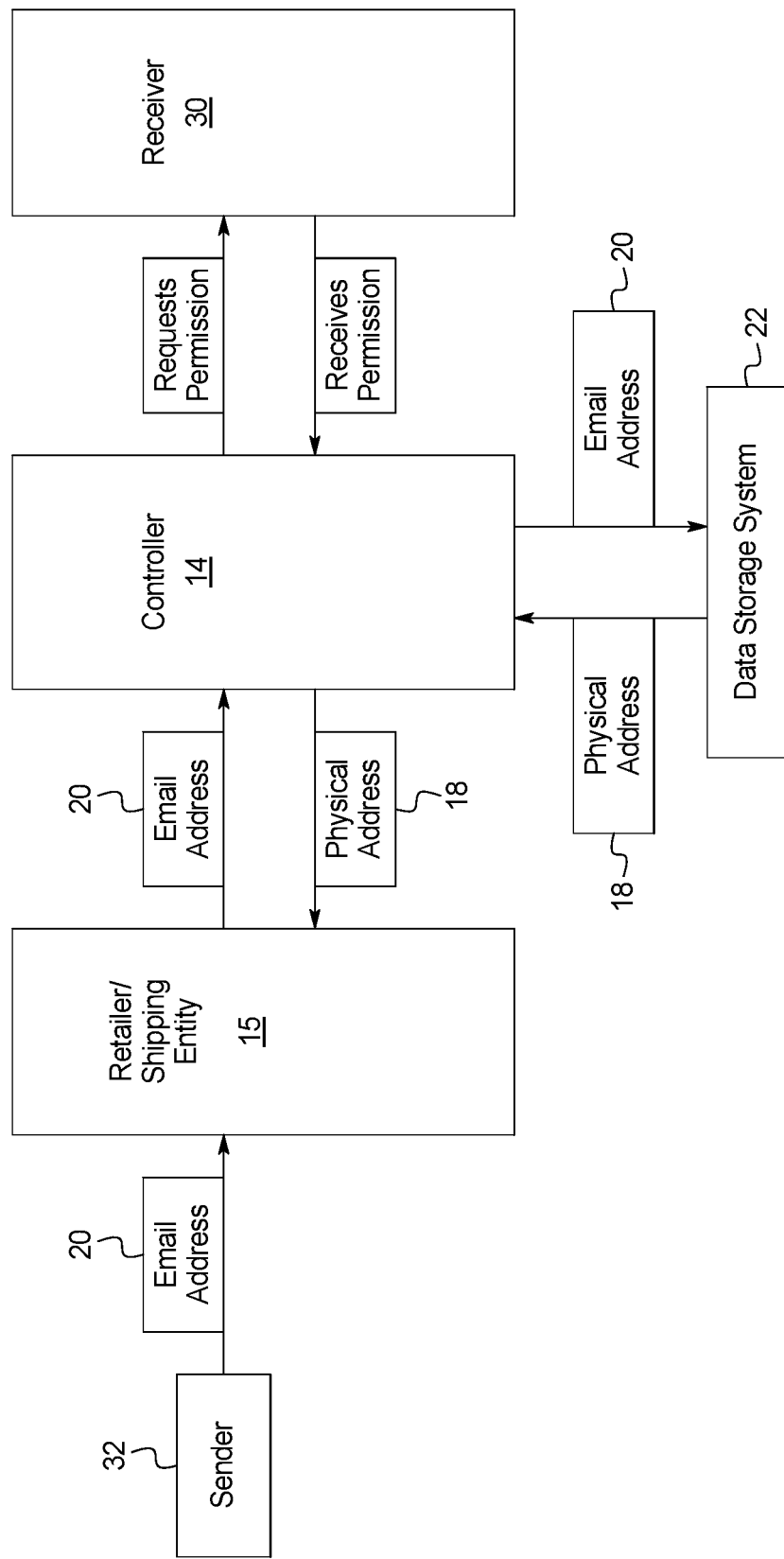
FIG. 3 is a flow diagram including an embodiment of the address exchange system.

As shown in FIG. 3, a sender 32 provides an email address 20 of the intended receiver 30 to the user 15 (e.g., retailer/shipping entity). Of course, any form of communication identification of the intended recipient is contemplated, including, but not limited to, social media identification, phone number, email address, among others. The user 15 then sends the email address 20 to the controller 14, via the API 16. The controller 14 sends an email (or other communication protocol 28; not shown) to the receiver 30 requesting permission to send the physical address 18 to the user 15.

If the receiver 30 grants the request, the controller 14 accesses the data storage system 22 and obtains the physical address 18 that corresponds to the email address 20, and provides the physical address 18 to the user 15 (e.g., retailer/shipping entity). Importantly, the physical address 18 is not provided to the sender 32. Instead, the physical address 18 remains confidential and only sent to the user 15, such as a retailer or shipping entity, for shipping purposes.

In one example, a sender 32 provides to the user 15 three pieces of information: an identifier of the intended receiver (e.g., email address, social media contact, phone number, etc.), an identification of the sender 32, and transaction details surrounding the item selected by the sender 32. The user 15 then provides the identification of the sender 32 and the transaction details to the receiver 30 for permission to provide the user 15 with the physical address 18 associated with the receiver 30. In yet another example, the sender 32 may provide an identifier of the intended receiver along with a geographical area associated with the recipient, such as a region of the country, state, town, municipality, or neighborhood, among others. Such geographical area can be used to calculate the estimated shipping and/or tax costs that can be communicated to the user for payment.

In addition, the user 15 is separate and distinct from the address exchange system 10. In other words, one of the main purposes of the address exchange system 10 is to confidentially supply physical addresses to users 15, such as merchants and shipping companies. The address exchange system 10 is not included within a retailer or shipping company. In other words, the address exchange system 10 is an independent entity from the user 15.

In one example, if a sender 32 selects an item for shipment to a physical address 18, wherein the identifier 19 is not contained in the data storage system 12, the controller 14 may be configured to send an email or other communication to the person or entity associated with the identifier 19 requesting, not only permission to provide the physical address 18, but the content of the physical address 18. Further, the controller 14 may be configured to send an email to the person or entity associated with the identifier 19 requesting authority to store an email address 20 and associated physical address 18 in the data storage system 22.

Figure 4:
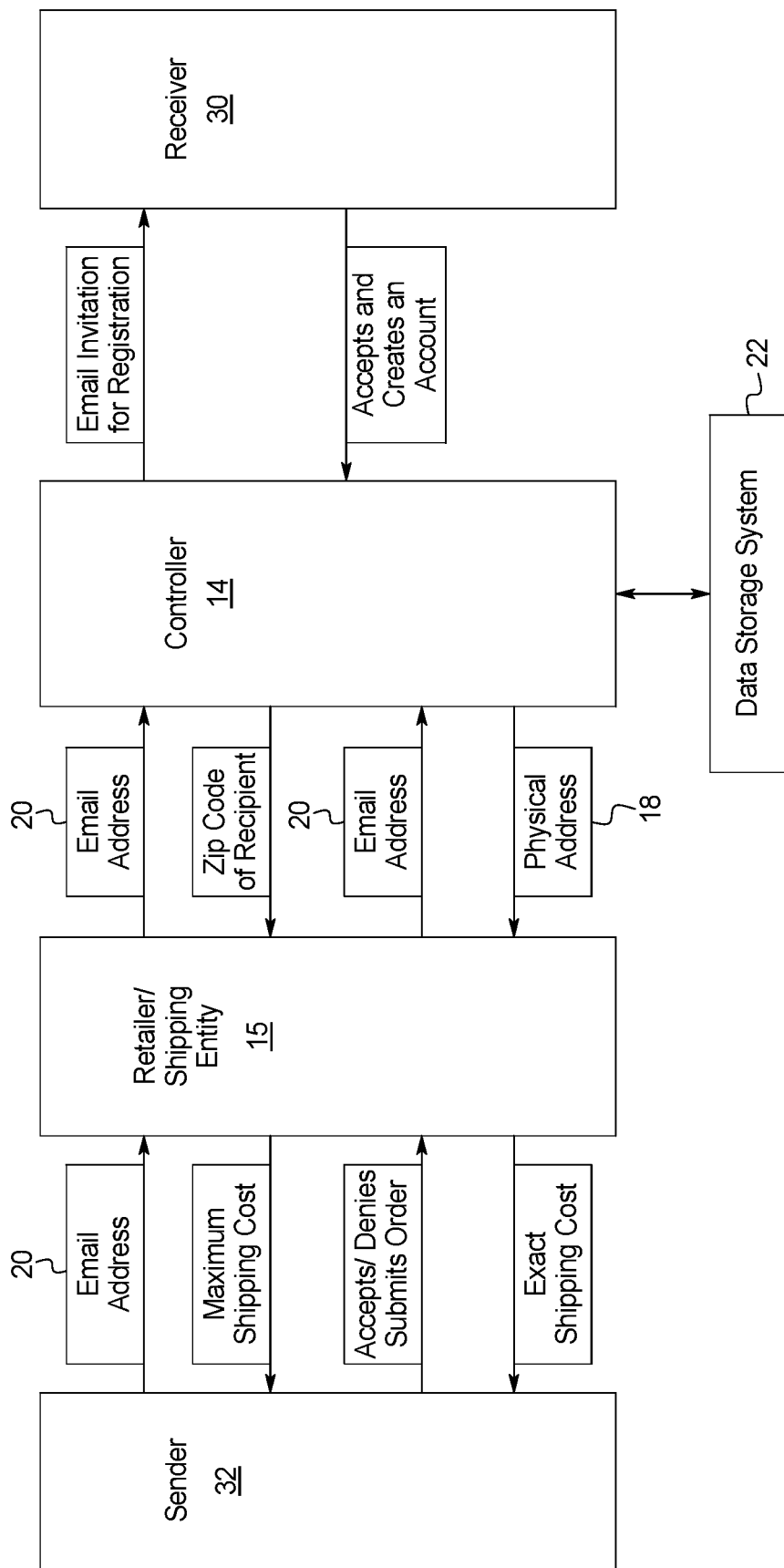
FIG. 4 is a flow diagram including an embodiment of the address exchange system.

For example, in FIG. 4 the sender 32 sends an email address 20 of the receiver 30 to the user 15 (e.g., retailer/shipping company) via the checkout interface 17, wherein the user 15 sends the email address 20 to the controller 14. The controller 14 may determine the email address 20 is not included in the data storage system 22, at which point the controller 14 may send an email invitation to the email address 20 requesting permission to store the email address 20 and an associated physical address 18 in the data storage system 22. If the receiver 30 registered the email address 20 and physical address 18 in the data storage system 22, the controller 14 provides the physical address 18 to the user 15.

In addition, FIG. 4 depicts a situation in which, upon receipt of an email address 20 not contained in the data storage system 22, the controller 14 is configured to request a zip code from the receiver 30, along with an invitation to register the receiver's 30 email address 20 and physical address 18 in the data storage system 22. Once authorization and the zip code is received from the receiver 30, the zip code may be used to estimate and provide a maximum shipping charge to the sender 32. If the user 15 receives confirmation from the sender 32 to proceed with the shipment based on the estimated charge, the transaction may be completed. Subsequently, the receiver 30 may provide the physical address 18 and complete registration. Once the physical address 18 is received, the controller 14 may then provide an exact shipping cost and sales tax to the user 15. The user 15 may then reimburse the sender 32 for any overage charges in the shipping and tax costs. If the email address 20 that is contained in the data storage system 22 is received by the controller 14, the address exchange system 10 may immediately calculate the shipping costs and sales tax for the sender 32 to confirm before completing the purchase.

In another example, upon receipt of an email address 20, the controller 14 is configured to request a zip code from the receiver 30. If the receiver 30 is not registered, the controller 14 indicates to the user 15 that the zip code is not available. The user 15 then calculates the maximum shipping cost and maximum sales tax to complete the transaction. After the transaction is complete, the controller is configured to request registration from the receiver 30, wherein registration includes submitting a physical address 18 associated with the email address 20 of the receiver, to be stored in the data storage system 22. Upon registration, the controller is configured to supply the user 15 with the physical address 18 of the receiver 30 such that the user 15 may calculate the exact sales tax and shipping cost, wherein the sales tax and shipping costs are based on the zip code of the receiver 30. The user 15 may then reimburse the sender 32 for any overcharged amount from the initial charged amount based on the maximum shipping and sales tax costs. Alternatively, if the receiver 30 is registered (i.e., the email address 20 is included in the data storage system 22), the controller may immediately send the zip code of the receiver 30 to the user 15, in order for the user 15 to calculate the sales tax and shipping costs, which will be presented to the sender 30. The sender 32 may then decide to submit the purchase of the item to be sent to the receiver 30.

In another embodiment, the address exchange system 10 comprises a memory 12 coupled to the controller 14, wherein the memory 12 is configured to store program instructions executable by the controller 14. In response to executing the program instructions, the controller 14 is configured to provide a data storage system 22 for storing an association between an identifier 19 and a physical address 18 and further storing one or more permission settings 24 defining situations in which the physical address 18 is to be provided in response to receipt of the identifier 19. The controller 14 is further configured to receive a request to provide the physical address 18, wherein the request includes the identifier 19. In response to receiving a request to provide the physical address 18, the data storage system 22 tests the permission settings 24 to determine whether or not to provide the associated physical address 18.

The request to provide the physical address 18 may be received from an API 16 through which a user 15 selects an item for shipment to a physical address 18, wherein the API 16 is configured to receive an identifier 19 from the user 15 and further configured not to receive the physical address 18 from the user 15. As described above, the request to provide the physical address 18 may further include a password 26.

As shown in FIG. 2, the address exchange system 10 may include various modules including recommendation services 34, advertisement services 36, address book services 38, social media services 40, sample management services 42, alert services 44, permission and privacy settings 46, and gift-receiving preferences 47. Based on a sender's 32 previous purchases or preferences, the recommendation services 34 may suggest the user 15 to promote certain products to the sender 32. For example, if a sender 32 has indicated in his preferences that he is interested in fishing, the recommendation service 34 may suggest, with the sender's 32 permission, to the user 15 to market fishing products to the sender 32. Similarly, the advertisement services 36 may provide tailored advertisements to a sender 32 based on the sender's 32 previous purchases or the sender's saved preferences. The product preferences 47 may include personal information related to the second user 30 such as size information for clothing, belts, and the like and style preferences such as handbags, hats, jewelry, brands, colors, and the like. For example, the controller 14 may receive a request to coordinate the sending of a video game to the receiver. Prior to communicating instructions to the user 15 to send the video game, the controller 14 may check the gift-receiving preferences 47 to determine if the receiver 30 has requested a specific video game, a brand of video games, and/or a video game for a specific console.

The address exchange system 10 may also include a sample management service 42 that allows senders 32 and receivers 30 to provide authority to certain retailers to send themselves samples of the retailer's products by simply inputting their email address 20 into a designated input in the preference section. While the illustrated examples refer to the sending of samples, it is contemplated that, as used herein, samples includes direct marketing as well as any other shipment, including shipments such as catalogs, offers, discounts, gifts, or other products. In some instances, a user 15 may indicate to the address exchange system 10 that the user 15 needs to distribute a number of samples to appropriate receivers 30. The controller 14 may be configured to then select appropriate receivers 30 based on the receiver's preferences and provide the physical address 18 of all of the appropriate receivers 30 to the sender 32 for shipment of the samples. In other words, as described in more detail below, the controller 14 may proactively identify receivers 30 based on the receiver's preferences enabling such a sender 32 may more easily identify appropriate receivers 30. For example, the controller 14 may suggest to a sender 32 who is sending samples to receivers 30, which people in the sender's network that are most likely to also benefit from the product, whether based on preferences, previous behavior, browser history, etc. One of the goals of direct marketing is to ensure that consumers and products are matched, as well as provide additional product options to consumers. Through the privacy options and preference settings, the system provides users with the option to select which types of products and/or brands they are open to receiving, limiting the amount of direct marketing to only items that consumers are truly interested in as well as alleviating some of the requirements of consumer tracking and monitoring for brands to fine-tune direct marketing approaches while also providing feedback to brands regarding trends and consumer demand. Another advantage of this streamlined approach to direct marketing is the reduction of printed materials sent to consumers' residential addresses, thereby reducing environmental costs.

In a first instance, a brand may be the sender 32 and an individual can be the receiver 30 of the sample. Then, in a second instance, the receiver 30 of the first instance becomes the sender 32 in the second instance for one or more new receivers 30. This enables the recipient of a sample, to then in turn gift equivalent samples to other recipients. Thus it can be seen that in at least some instances, the address is not available to the sender 32 at the time of the transaction.

For example, a brand may provide a sample opportunity to the sample management service 42 module (e.g., Sephora may be interested in distributing samples of a shampoo they sell), the sample management service 42 module may identify appropriate receivers 30 and distribute the samples to the receivers 30 without sharing the receivers' data/information with Sephora.

In some instances, the brand may receive no information about the receivers 30, in other instances the brand may receive certain digital parameters about the receivers 30 (age, gender, etc.), but not the address, and in other instances the brand may receive all the details of the receivers 30. Such information may be shared with the brand While primarily described in the context of samples, the sample management service 42 may be a gift management service 42 or similar. Also, by incorporating the other features and functions of the address exchange system 10, the sample management service 42 does not require the sender 32 to know the address of the receiver(s) 30.

As described above, the controller 14 may be configured to then select appropriate receivers 30 based on the receiver's preferences and provide the physical address 18 of all of the appropriate receivers 30 to the sender 32 for shipment of the samples, gifts, or other products. This selection may be an automatic selection and execution of shipment to receivers 30 or may be a presentation of selected receivers 30 to the sender 32 from which the sender may choose.

The address exchange system 10 may further include an address book service 38 that allows senders 32 to manage their contacts by adding, removing, updating, and deleting their contact list via a user interface or an API in communication with the controller 14, as shown in FIG. 2. When a sender 32 is ready to checkout online from the user 15, the sender 32 may select an option wherein user 15 may collect information about the sender 32 from the address book of the sender 32 such that the sender 32 does not need to provide information about himself or herself. The sender 32 may also provide one or more receivers 30 from the user's address book, wherein the address book lists contacts and associated email addresses 20. For example, the checkout interface 17 may display an option requesting access to the sender's 32 address book. The sender 32 may also classify the contacts in predefined groups and may have associated shipping preferences. For example, the group, "Family & Friends", may be associated with a shipping preference that indicates the controller 14 to provide the receiver's 30 home address, whereas the group, "Colleagues", may have a shipping preference that indicates to the controller 14 to provide the receiver's 30 work address. Further, the address book service 38 may be in communication with a social media service 40. For example, a sender 32 may import his contacts from a social networking site into the address book service 38 of the address exchange system 10.

As discussed above, the address exchange system 10 may include a privacy and permission setting module 46 that allows receivers 30 to program preferences and privacy and permission settings. The preferred privacy and permission settings may be dependent on each sender 32 or groups, such as "Family & Friends." In addition, the address exchange system 10 may include an alert service 44 that sends a sender 32 or a receiver 30 a notification regarding a shipment, a notification of relevant products, a message regarding an advertisement, a social media alert, among others. In other embodiments, receivers may add items, products, or brands to a wish list that is monitored by or made available to senders. Each item on the wish list may include a price expectation or range, and the system may provide the information to brands whose pricing matches the pricing set in the user's preferences.

As mentioned above, the address exchange system 10 may also include a recommendation service 34 that stores a sender's 32 life style preferences, birthdates, wish lists, gift receiving behaviors, and product reviews. Various third parties, such as retailers, may use the sender's 32 preference information to provide suitable samples and recommendations of other products through the sample management service 42 and/or the advertisement services 36 of the address exchange system 10. For example, the recommendation service 34 may track the received products and services of the receiver 30 and, upon permission from the receiver 30, share the behavior information with users 15, such as retailers or merchants. With the behavior information, users 15 (e.g., retailers and merchants) may be capable of providing real-time recommendations via the recommendation services 34, advertisements via the advertisement services 36, and/or offers via the offer management services 42, all based on the receiver's 30 activity. Similar services, may be presented to a sender 32 based on the sender's 32 activities.

The receiver 30 may also manage his or her physical address 18 through a user interface or an API in communication with the controller 14. For example, if the receiver 30 needs to change or add a physical address 18, the receiver 30 may do so by, for example, logging onto his or her account within the address exchange system 10. In addition, the address exchange system 10 may include an update address service that pushes the receiver's 30 new address to all third-party service providers. For example, instead of a receiver 30 contacting each third-party service provider (e.g., financial institution, magazine subscriptions, utility company, internal revenue service, etc.), the address exchange system 10 automatically contacts and updates the receiver's 30 address with each third-party service provider within the receiver's address book. The platform presented herein provides an option for the user to selectively and automatically update one or more of the physical addresses associated with his or her profile or user account. The system also allows for users to update time frames for availability to accept packages in order to avoid delivery during vacations or other specific times.

As mentioned above, the check-out interface 17 and/or the API 16 may be provided within an ecommerce platform and/or shipping platform. Further, as shown in FIG. 5, the sender 32 may provide an email address 20 during check out. For example, instead of entering in a shipping address, the sender 32 enters the email address 20 of the receiver 30. The associated physical address 18 is provided by the address exchange system 10, as described above.

The address exchange system 10 may be integrated within a check-out system associated with the user 15 by any suitable manner. For example, the integration may be through a secured, customized API that facilitates data flow between a checkout platform of the user 15 and the address exchange system 10. Alternatively, an external plugin to the checkout module from the address exchange system 10 may be provided. Customized extensions may be created for multiple ecommerce platforms and numerous retailers and merchants. The address exchange system 10 may also be in communication with a payment provider during check out.

The address exchange system 10 may also include a service that stores a receiver's 30 preferences, birthdates, wish lists, gift receiving behaviors, and product reviews. For example, the preferences of the receiver 30 may include the receiver's clothing sizes, shoe size, color preference, size of heel preference, type of shirt preference, length of skirt preference, type of pants preference, among others. As such, upon a sender's 32 selection of an item for purchase, the user 15 may access the system 10 to receive the receiver's 30 appropriate clothing size. In an example, the system 10 may provide the user 15 with the correct clothing size in a manner in which the sender 32 does not receive the clothing size, i.e., the clothing size may remain confidential. A receiver 30 may submit various preferences when the receiver 30 registers the receiver's 30 email address 20 (or other identifier 19) with the data storage system 22.

In one example, a sender 32 selects an item for purchase and shipment to a receiver 30. For example, the sender 32 sends an email address 20 of the receiver 30 to the user 15 (e.g., retailer/shipping company) via the checkout interface 17, wherein the user 15 sends the email address 20 to the controller 14. If the receiver 30 has registered the email address 20 and preferences in the data storage system 22, the controller 14 provides the preferences to the user 15. The user 15 may then complete the purchase and send, for example, the appropriate sized item to the receiver 30. As a result, the sender 32 no longer needs to know the preferences, for example clothing sizes, of a receiver 30 before purchasing a gift.

The receiver 30 may maintain a user profile on a social media platform 48 that indicates one or more preferences related to items or other preference information. For example, the receiver 32 may maintain a profile on a dating website that specifies her preferred colors and flowers, her restaurant preferences, her clothing sizes, etc. The controller 14 may monitor the receiver's 30 preference information on the social media platform 48 in addition to the sender 32 and receiver's 30 online relationships. When the sender 32 submits the receiver's 30 identifier 19 and an item to be shipped to the controller 14, the controller 14 may access the receiver's 30 profile on the dating website and determine the color and size of the item to be shipped before sending the information to the user 15 such as an online retailer. In a preferred embodiment, that information would not be shared with the sender 32.

As shown, the system 10 is in direct communication with the searchable storage structure 22, which, in one example, may be a database. Of course, in other embodiments, the system 10 may be in communication with the database through a network. While shown and described as a database, it is understood that the database may be any number of databases adapted to support the necessary data management to support the various features and functions of the system 10 described herein. It is further contemplated that a database, as understood in the traditional sense, may not be a requirement of the system 10 described herein, and that any other mechanism or mode of data management may be employed.

Figure 6:
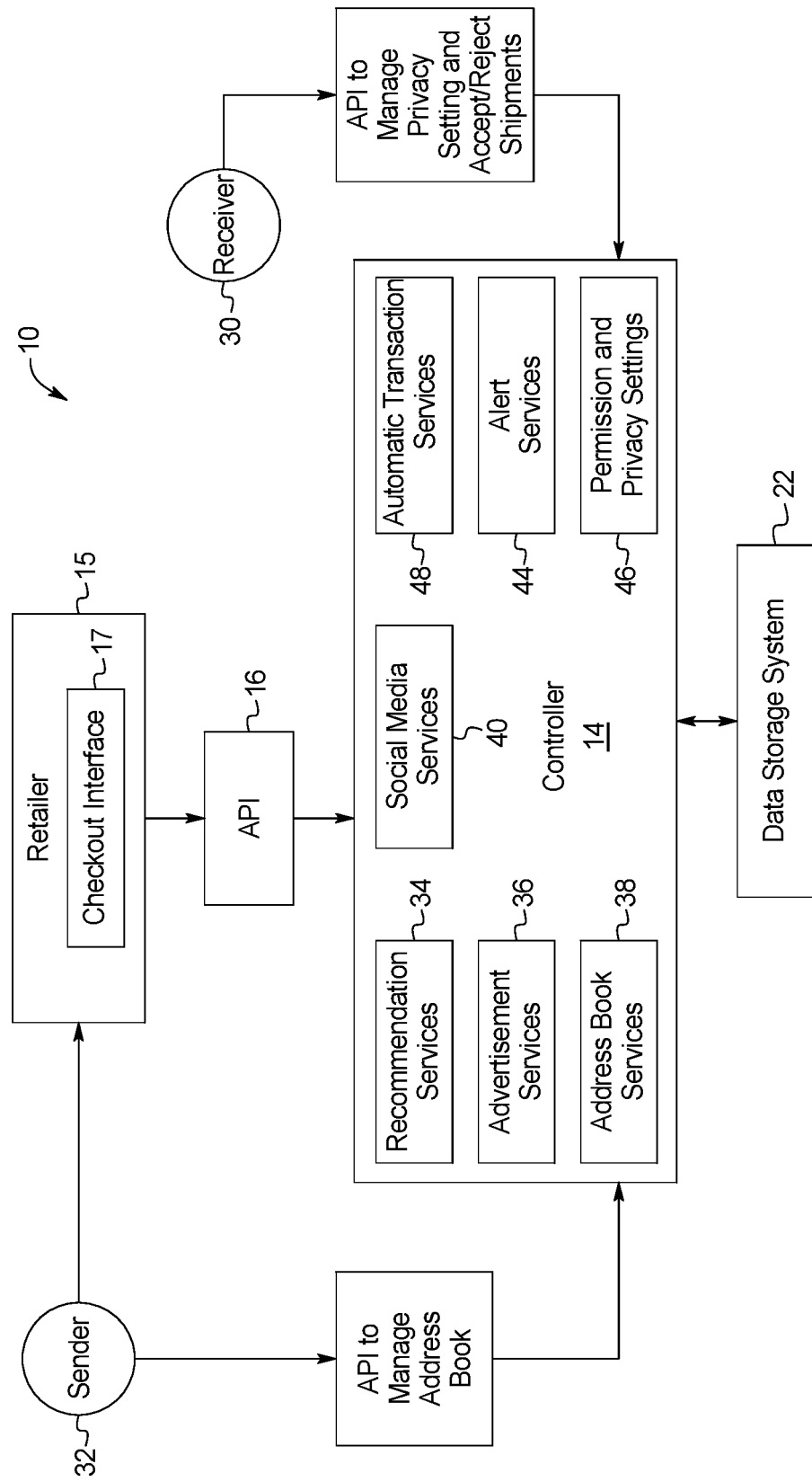
FIG. 6 is a schematic of another embodiment of the address exchange system in relation to a sender and receiver.

Turning now to the example of the address exchange system 10 shown in FIG. 6, another embodiment of the address exchange system 10 may include various modules including recommendation services 34, advertisement services 36, address book services 38, social media services 40, automatic transaction management services 48, alert services 44, and permission and privacy settings 46.

Building on the examples provided above with respect to the sample management service 42 module, the automatic transaction management services 48 module may enable various types of automatic transactions, including the automatic execution of offers. Not only may the address exchange system 10 be adapted to automatically determine receivers 30 for whom the sender 32 may provide gifts and/or samples, the address exchange system 10 be adapted to automatically determine and execute other automatic transactions. As above, in at least some instances, the address is not available to the sender 32 at the time of the transaction. In other examples, the system enables senders to automatically send items, products, or samples to different addresses based on sender preferences.

For example, users may set appropriate preferences (e.g., filters) through the permission setting module 46 that enable the transaction management services 48 to automatically execute transactions when certain conditions are met or to automatically notify users when conditions are met to suggest a transaction is appropriate. Additionally, consumers or receivers may choose to authorize or to not authorize the sharing of information, including the physical address, before the transaction. In other embodiments, the details of the consumer or receiver may be shared only when criteria defined by the consumer or receiver in the privacy/preferences settings is met.

In one example, a user may set preferences such as pricing and other filter controls in the permission and privacy setting module 46 that indicate types of products (e.g., product categories), specific products (e.g., specific branded product), brands, price points or price ranges, dates or date ranges, addresses, etc. to be used for the transaction management services 48. Then, when the preference preconditions are met, the automatic transaction management services 48 module executes one or more automatic transactions. In one example, the system automatically executes a transaction when the seller or sender meets a purchase price set by a buyer or receiver. In another example, a user sets a deadline for a plurality of sellers to compete to complete the sale by either being the lowest bidder or by meeting the sale price criteria established by the user.

For example, a user may set preferences that indicate the user would like to buy a new laptop, from one of a set of specific brands (e.g., Dell, Lenovo, or HP), with specific minimum specifications (e.g., 13" screen, 7th generation Intel i7 processor or better, 8 MB RAM or better, etc.), under a given price (e.g., $800), prior to a given date (e.g., before Nov. 1, 2018). If a brand or retailer makes an offer available to the automatic transaction management services 48 module that meets the given criteria, the automatic transaction management services 48 module may automatically execute the transaction on behalf of the receiver 30. Similarly, short of fully executing the transaction, the automatic transaction management services 48 module may simply inform the user that the stated conditions for purchase have been met, enabling the user to choose whether to execute the transaction. In another example, sellers have the option to provide the lowest price to the consumer. The system may open the deal to sellers and automatically execute the transaction with the lowest seller when the deal is closed, or, alternatively, may provide the options to the receiver and allow the receiver to select an option.

The sample management service 42 module and/or the transaction management services 48 module may also be used to enable opt-in receiving of gift or samples with well-defined specificity. For example, in combination with the permission and privacy setting module 46 with the transaction management services 48 module (and/or the sample management service 42 module) may enable a user to opt-in to receive from certain people, from certain brands, or for certain non-brand specific products, and at which address to receive such products, etc. For example, a receiver 30 could specify that he or she will receive Proctor and Gamble products from Proctor and Gamble at the receiver's home address. A receiver 30 could also specify that he or she will receive vacation packages or mortgage offers from all sellers. In another example, a receiver may select a category of goods, brands, or specific products and accept items only if the goods are available for free or if the sender agrees to pay. In a further example, the receiver may opt-in to automatically receive offers or products based on a time limitation. In one example, a receiver may set a preference to receive offers for new car insurance for a period of time before the expiration of the current insurance, as the receiver will have selected a new car insurance provider by that date.

With respect to samples, the opt-in preference setting provides a solution to problems that arise within the samples environment. From the brand perspective, samples often get delivered to the incorrect address or to unqualified prospects, or are stolen from the receiver's front porch or entrance. Consumers are hesitant to voluntarily accept samples out of privacy concerns for brands or marketing companies having access to personal information such as a home address. Consumers often decline to share their address information to avoid having their information sold to other parties and to avoid receipt of an excessive amount of unwanted, free samples, offers, or coupons. In one embodiment, the present system includes a Get a Sample opt-in setting and a Gift a Sample opt-in setting. While "Get a Sample" and "Gift a Sample" are terms used to describe the various settings, the names or references may vary.

In the Get a Sample opt-in setting, a receiver sets his opt-in preferences to indicate that he is open to receiving a particular type of sample. A brand or vendor may send him samples of a product directly or indirectly through a third-party shipping partner to the receiver without obtaining the receiver's physical address. Alternatively, the receiver may select via the opt-in preferences to authorize the system to share the receiver's address of a brand or vendor offering a desired product sample. The receiver may also select via the opt-in preferences a time frame during which samples may be received. In the Gift a Sample opt-in setting, a sender sets his opt-in preferences to indicate that he is wants to send a sample or product to one or more of the sender's friends without obtaining the friend's physical address. If the recipient has preferences set that allow for the receipt of such a gift or sample, the system enables the gift or sample to be delivered in accordance with the receiver's settings. In another embodiment, a user may receive an offer for a gift or sample, and the system may alert the user that a friend within his social network has set his preferences to indicate an interest in receiving that gift or sample. The alert may be a notice that the friend is interested in the offer or sample. The user may elect to send the sample or offer to the friend, or the system may automatically determine whether to send the product or offer to the friend. In this embodiment, the user's friend network is leveraged such that an offer to one user may be reasonably distributed across the friend network. Artificial or machine intelligence may be used to distribute offers or samples across networks within the system.

With these controls, users may find it easy to provide windows in which they are open to receiving samples to try new products. For example, a user may easily audition new products within a given time frame when trying to make a purchasing decision. A receiver 30 may indicate a preference to receive samples of hand soaps within the next month. Brands may then capitalize on that opportunity to send said samples to the receiver 30. The brands benefit from sending an appropriate sample to a proactively interested receiver 30, the receiver 30 benefits from receiving desired product at the desired time and also benefits from doing so anonymously with respect to the brand (i.e., only the address exchange system 10 knows the receiver's information, the receiver 30 and the receiver's contact information are not shared with the sender 32).

The controls may also allow receiver-user 30 to manage relationships with individuals and/or business senders and to provide opt-in preferences for third-parties to contact the receiver 30. Preferences related to the relationships can be stored in a database, a distributed ledger (i.e., a blockchain), or the like. In one embodiment, the receiver can accept or refuse incoming mail from a sender. If accepted, the receiver can select the physical address of where the mail is to be delivered and/or provide specific delivery instructions for each sender, such as hold, forward, and pick-up. In another embodiment, the receiver can select from default options, such as "accept from all," which may be used where the receiver does not have a phone or email account to access preference settings. Another default option may be "never accept," which may be used where the receiver is deceased. The acceptance/refusal and the delivery preferences are stored in the database. In another embodiment, a receiver creates a group based on pre-existing conditions or user-selected/created conditions. An example pre-existing condition may be based on social media connections. In a user-selected/created example, the user may create a group within the system and place the sender into the group. In another embodiment, the system can forward the receiver's address to the business if the receiver has authorized address sharing/update or if the business is authorized to retrieve a current address from the system in the user preferences. In a still further embodiment, the receiver 30 may select preferences to opt-in to receiver offers from a third party that the receiver would like to try or purchase per the description above. The receiver may set a preference to limit the channels of communication through which the third party seller/brand may contact the receiver. A receiver may set user preferences to receive digital coupons from select first third party brand, to receive physical coupons from other third party brands, to receive phone calls from certain other parties, to receive text messages for other third party sellers. The receiver may also restrict contact by day of the week and/or time of day, including a start date and/or an end date. Any other control/preference settings described throughout the application may be stored in a database as described herein.

Within the address exchange system 10 through the permission and privacy setting module 46 the receiver 30 may set the preferences regarding what information is shared with the sender 32 at the time of the transaction. In addition, the receiver 30 may set the preferences regarding what information is shared with the sender 32 before, during, and after the transaction. For example, the receiver 30 may chose not to share contact information with the sender 32 prior to the transaction, but after a successful transaction, the receiver 30 may choose to share the contact information. In another example, address information is shared with senders 32 within certain product categories and not shared with senders 32 within other product categories. In yet another example, the receiver may choose between options to share some information, share no information, share a proxy for the receiver's contact information, such as a QR code that provides the receiver's contact information to a third-party shipper (e.g., USPS, FedEx, UPS), etc. Those skilled in the art will recognize the range of options that may be made available through the address exchange system 10 and specifically the transaction management services 48 module and the permission setting 46 module. Basically, the receiver 30 decides what information is shared before and after transaction, including whether the address is shared at all and, in case the receiver 30 chooses not to share the address with the sender 32, the payment verification can be authorized through the address exchange system 10.

The system may also include rapid login/checkout features for brands and ecommerce sites. In one example, a receiver or an ecommerce customer may use a third-party platform to manage the customer information and how it is or is not shared to each party in the checkout and delivery chain.

For merchants, the third-party platform can provide the customer name, email, phone number, GPS location, or any other information required for checkout to the merchant or seller. The address provided to the merchant may be a default address or may be an address specified by the customer to be associated with the specific merchant. The third-party platform may also provide delivery instructions such as, for example, hold, forwarding address, self-pickup, etc. Further, The third-party platform may provide the customer's personal information, including the customer's delivery address, or the customer's digital ID and/or GPS location coordinates. The digital ID may be, for example, an email address, a cell phone number, etc. Accordingly, the merchant may or may never see the details of the buyer.

On the consumer side, the consumer's contacts list may be passed to the merchant during the checkout or at another time. In another embodiment, the consumer may be able to select a subset from the contacts list to share with the merchant to send purchases, gifts, samples, offers, etc. If the consumer has multiple addresses in the system, the selected one or more addresses can be passed through merchant portal and special delivery instructions like hold, forward, self-pickup, drone delivery to real time GPS locations, etc. can be scheduled.

In one example, the system 10 includes an electronic device, such as a portable electronic device embodied in a touchscreen-enabled smartphone as the user interface 30. However, it is understood that the teachings provided may be applied to numerous variations of electronic devices with user interfaces 30, including desktop computers, remote controls, etc., as will be recognized by those skilled in the art based on the teachings herein.

As shown in FIG. 1, aspects of the systems described herein are controlled by one or more controllers 14. The one or more controllers 14 may be adapted run a variety of application programs, access and store data, including accessing and storing data in associated databases, and enable one or more interactions as described herein. Typically, the one or more controllers 14 are implemented by one or more programmable data processing devices. The hardware elements, operating systems, and programming languages of such devices are conventional in nature, and it is presumed that those skilled in the art are adequately familiar therewith.

For example, the one or more controllers 14 may be a PC based implementation of a central control processing system utilizing a central processing unit (CPU), memory 14 and an interconnect bus. The CPU may contain a single microcontroller, or it may contain a plurality of microprocessors for configuring the CPU as a multi-processor system. The memory 14 include a main memory, such as a dynamic random access memory (DRAM) and cache, as well as a read only memory, such as a PROM, EPROM, FLASH-EPROM, or the like. The system 10 may also include any form of volatile or non-volatile memory 14. In operation, the memory 14 stores at least portions of instructions for execution by the CPU and data for processing in accord with the executed instructions.

The one or more controllers 14 may also include one or more input/output interfaces for communications with one or more processing systems. Although not shown, one or more such interfaces may enable communications via a network, e.g., to enable sending and receiving instructions electronically. The communication links may be wired or wireless.

The one or more controllers 14 may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller 14. For example, the one or more controllers 14 may include a graphics subsystem to drive the output mechanism. The links of the peripherals to the system may be wired connections or use wireless communications.

In one embodiment, the system may assign a unique transaction code, such as a barcode, a QR code, an RFID code, or the like, to each shipping transaction that is associated with the delivery details related to the sender, the receiver, and the contents of the shipment and is programmed to share one or more details with each party interacting with the shipment. In one example, a delivery person may receive the shipping address but may not access information about the content of the package. Other parties that can utilize the transaction code include U.S. Customs and Border Protection, the shipping company, a delivery service, etc.

In some embodiments, the system may assign a unique item code to facilitate the automatic purchase, opt-in features, or sample functionalities of the system. The unique item code may be a SKU code, a UPC number, a Product Type, or a Produce ID to tangible and non-tangible goods. In one example, a vacation package may be assigned a SKU code, a "vacation" as a Product Type, and include travel dates, location, and level of service of flight as various Product IDs.

Although summarized above as a PC-type implementation, those skilled in the art will recognize that the one or more controllers 14 also encompasses systems such as host computers, servers, workstations, network terminals, and the like. Further one or more controllers 14 may be embodied in a device, such as a mobile electronic device, like a smartphone or tablet computer. In fact, the use of the term controller 14 is intended to represent a broad category of components that are well known in the art.

Hence aspects of the systems and methods provided herein encompass hardware and software for controlling the relevant functions. Software may take the form of code or executable instructions for causing a controller 14 or other programmable equipment to perform the relevant steps, where the code or instructions are carried by or otherwise embodied in a medium readable by the controller 14 or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory 14 of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller 50 can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method and portable electronic device may be provided based on various combinations of the features and functions from the subject matter provided herein.

We claim:

1. A product distribution system comprising:
a data storage system including a physical address associated with each of a plurality of individuals;
a controller in communication with the database;
a memory coupled to the controller, wherein the memory stores program instructions, when executed by the controller causes the controller to perform the steps of:
receiving, by a permission setting module, as input from one of the plurality of individuals, characteristics of a desired product including one of either a product category or product identification and either price or price range and either a date or a date range as well as sharing preferences for additional information related to the one of the plurality of individuals dictating what information related to the one of the plurality of individuals is to be shared by the system and under what conditions that information is to be shared;
receiving, as input from a seller, product characteristics of a product available from the seller to be sold to one or more of the plurality of individuals, the product characteristics including a product category or a product identification and a price or a price range and a date or a date range;
identifying, using the received product characteristics from the permissions setting module, a product available from the seller to be sold to one or more of the plurality of individuals and the characteristics of the desired product, a matching transaction including an identified product and an identified individual;
determining, by the controller, that a matching transaction has been identified; and
based on a determination, by the controller, that the matching transaction has been identified, facilitating delivery of the identified product to the identified individual without revealing the physical address of the one of the plurality of individuals to the seller and any additional information related to the one of the plurality of individuals is only shared with the seller according to the preferences of the one of the plurality of individuals.

2. The system of claim 1, wherein the physical address of the identified individual is provided to a shipper.

3. The system of claim 1, wherein the price that is input from the seller is "free".

4. The system of claim 1, wherein the product identification in the product characteristics is a specific brand name of a product.

5. The system of claim 1, wherein the seller is a brand.

6. The system of claim 1, wherein the seller is a retailer.

7. The system of claim 1, wherein the date range that received, as input from one of the plurality of individuals via a permission setting module, is prior to a given date.

8. The system of claim 1, wherein the facilitation of the delivery of the identified product to the identified individual occurs automatically without human intervention.

9. The system of claim 1, wherein the facilitation of the delivery of the identified product to the identified individual occurs in response to approval by the identified individual.

10. A product distribution method comprising:
providing a data storage system including a physical address associated with each of a plurality of individuals;
providing a controller in communication with the database;
providing a memory coupled to the controller, wherein the memory stores program instructions, when executed by the controller causes the controller to perform the steps of:
receiving, as input from a seller, product characteristics of a product available from the seller to be sold to one or more of the plurality of individuals, the product characteristics including a product category or a product identification and a price or a price range and a date or a date range as well as sharing preferences for additional information related to the one of the plurality of individuals dictating what information related to the one of the plurality of individuals is to be shared by the system and under what conditions that information is to be shared;
receiving, by a permission setting module, as input from one of the plurality of individuals, characteristics of a desired product including one of either a product category or product identification and either price or price range and either a date or a date range;
automatically without human intervention identifying, using the received product characteristics from the permission setting module a product available from the seller to be sold to one or more of the plurality of individuals and the characteristics of the desired product, a matching transaction including an identified product and an identified individual;
determining, by the controller, that a matching transaction has been identified; and
based on a determination, by the controller, that a matching transaction has been identified, facilitating delivery of the identified product to the identified individual without revealing the physical address of the one of the plurality of individuals to the seller and any additional information related to the one of the plurality of individuals is only shared with the seller according to the preferences of the one of the plurality of individuals.

11. The product distribution method of claim 10, wherein the physical address of the identified individual is provided to a shipper.

12. The product distribution method of claim 10, wherein the price that is input from the seller is "free".

13. The product distribution method of claim 10, wherein the product identification in the product characteristics is a specific brand name of a product.

14. The product distribution method of claim 10, wherein the date range that received, as input from one of the plurality of individuals via a permission setting module, is prior to a given date.

15. The product distribution method of claim 10, wherein the facilitation of the delivery of the identified product to the identified individual occurs automatically without human intervention.

16. The product distribution method of claim 10, wherein the facilitation of the delivery of the identified product to the identified individual occurs in response to approval by the identified individual.

17. A product distribution system comprising:
a data storage system including a physical address associated with each of a plurality of individuals;
a controller in communication with the database;
a memory coupled to the controller, wherein the memory stores program instructions, when executed by the controller causes the controller to perform the steps of:
receiving, by a permission setting module, as input from one of the plurality of individuals, characteristics of a desired product including one of either a product category or product identification and either price or price range and either a date or a date range as well as sharing preferences for additional information related to the one of the plurality of individuals dictating what information related to the one of the plurality of individuals is to be shared by the system and under what conditions that information is to be shared;
receiving, as input from a plurality of sellers in a reverse auction format, offers to sell a product to the one of the plurality of individuals that meet the characteristics of the desired product input by the one of the plurality of individuals;
determining, by the controller, that a winner of the reverse auction inputs from the plurality of sellers has been identified, wherein the winner is identified automatically or by the user; and
based on a determination, by the controller, that the winner has been identified, facilitating delivery of the identified product to the one of the plurality of individuals without revealing the physical address of the one of the plurality of individuals to any of the plurality of sellers and any additional information related to the one of the plurality of individuals is only shared with the seller according to the preferences of the one of the plurality of individuals.

18. The product distribution system of claim 17, wherein the input from the plurality of sellers is automatic based on data stored in the data storage system.

19. The product distribution system of claim 17, wherein the input from the plurality of sellers is manually input by the sellers in response to a notification of the reverse auction.

20. The product distribution system of claim 17, wherein the physical address of the identified individual is provided to a shipper.

* * * * *